United States Patent
Fujita et al.

(10) Patent No.: US 10,669,386 B2
(45) Date of Patent: Jun. 2, 2020

(54) FIBER-REINFORCED MOLDING MATERIAL AND MOLDED ARTICLE USING SAME

(71) Applicant: DIC Corporation, Tokyo (JP)

(72) Inventors: Yukiko Fujita, Osaka (JP); Takashi Yasumura, Osaka (JP)

(73) Assignee: DIC CORPORATION, Tokyo (JP)

( * ) Notice: Subject to any disclaimer, the term of this patent is extended or adjusted under 35 U.S.C. 154(b) by 21 days.

(21) Appl. No.: 16/316,603

(22) PCT Filed: Jun. 29, 2017

(86) PCT No.: PCT/JP2017/023898
§ 371 (c)(1),
(2) Date: Jan. 9, 2019

(87) PCT Pub. No.: WO2018/070076
PCT Pub. Date: Apr. 19, 2018

(65) Prior Publication Data
US 2020/0071474 A1 Mar. 5, 2020

(30) Foreign Application Priority Data

Oct. 11, 2016 (JP) ................................. 2016-200124

(51) Int. Cl.
| | | |
|---|---|---|
| C08J 5/04 | (2006.01) | |
| B29B 7/90 | (2006.01) | |
| B29C 70/12 | (2006.01) | |
| B29C 70/34 | (2006.01) | |
| B29K 63/00 | (2006.01) | |
| B29K 307/04 | (2006.01) | |

(52) U.S. Cl.
CPC ................. C08J 5/042 (2013.01); B29B 7/90 (2013.01); B29C 70/12 (2013.01); B29C 70/345 (2013.01); B29K 2063/00 (2013.01); B29K 2307/04 (2013.01); C08J 2363/02 (2013.01)

(58) Field of Classification Search
CPC .............. C08J 2363/02; B29K 2063/00; C08F 290/064
USPC ........................................................ 524/495
See application file for complete search history.

(56) References Cited

U.S. PATENT DOCUMENTS

| | | | | |
|---|---|---|---|---|
| 5,756,600 A | * | 5/1998 | Okumura | .................. C08F 8/30 428/297.4 |
| 2006/0270810 A1 | * | 11/2006 | Yasumura | ........... C08F 290/064 525/529 |
| 2017/0298199 A1 | | 10/2017 | Akiyama et al. | |

FOREIGN PATENT DOCUMENTS

| | | | |
|---|---|---|---|
| JP | H09-110948 A | | 4/1997 |
| JP | 2005-154589 A | | 6/2005 |
| JP | 2006-152104 | * | 6/2005 |
| JP | 2005-247879 A | | 9/2005 |
| JP | 2006-045404 A | | 2/2006 |
| JP | 2006-052271 A | | 2/2006 |
| JP | 2009-13306 A | | 1/2009 |
| JP | 2013-053266 A | | 3/2013 |
| JP | 6150034 B1 | | 6/2017 |
| JP | 6156612 B1 | | 7/2017 |
| WO | 2015/133289 A1 | | 9/2015 |
| WO | 2016/039326 A1 | | 3/2016 |

OTHER PUBLICATIONS

Machine translation of JP 2006-152014 (Year: 2006).*
International Search Report dated Aug. 1, 2017 issued in International Patent Application No. PCT/JP2017/023898 (with English translation).

* cited by examiner

*Primary Examiner* — Doris L Lee
(74) *Attorney, Agent, or Firm* — McDermott Will & Emery LLP

(57) ABSTRACT

Provided is a fiber-reinforced molding material including as essential materials: a vinyl ester (A) that is a reaction product of an epoxy resin (a1) having an epoxy equivalent in the range of 180 to 500 and (meth)acrylic acid (a2); an unsaturated monomer (B) having a flash point of 100° C. or higher; a polyisocyanate (C); a polymerization initiator (D); and carbon fibers (E) having a fiber length of 2.5 to 50 mm, in which the mass ratio ((A)/(B)) of the vinyl ester (A) to the unsaturated monomer (B) is in the range of 40/60 to 85/15, and the molar ratio (NCO/OH) of isocyanate groups (NCO) in the polyisocyanate (C) to hydroxy groups (OH) in the vinyl ester (A) is in the range of 0.25 to 0.85.

11 Claims, No Drawings

FIBER-REINFORCED MOLDING MATERIAL AND MOLDED ARTICLE USING SAME

CROSS REFERENCE

This patent application is the U.S. National Phase under 35 U.S.C. § 371 of International Application No. PCT/JP2017/023898, filed on Jun. 29, 2017, which claims the benefit of Japanese Patent Application No. 2016-200124, filed on Oct. 11, 2016, the entire contents of each are hereby incorporated by reference.

TECHNICAL FIELD

The present invention relates to a fiber-reinforced molding material that is excellent in workability, working environment, and moldability in handling the molding material, and that can provide a molded article excellent in various physical properties, such as bending strength and bending elastic modulus, and also relates to a molded article thereof.

BACKGROUND ART

Fiber-reinforced resin composite materials in which a thermosetting resin, such as an epoxy resin or an unsaturated polyester resin, is reinforced with carbon fibers as reinforcing fibers, have attracted attention due to their characteristics of light weight and yet excellent heat resistance and mechanical strength, and are increasingly used in various structures, such as housings or various members of automobiles and aircraft. A known method for molding such a fiber-reinforced resin composite material produced using an epoxy resin is an autoclave method in which a material called prepreg is cured by heating in an autoclave that can be pressurized. In a known method for molding a material produced using an unsaturated polyester resin, an intermediate material called a sheet molding compound (SMC) or a bulk molding compound (BMC) is cured and molded by press molding, injection molding, or other techniques. Particularly in recent years, development of materials excellent in productivity has actively been promoted.

A known example of such molding materials is a carbon fiber-reinforced sheet-shaped molding material containing an unsaturated polyester, a vinyl monomer, a thermoplastic polymer, a polyisocyanate, a filler, a conductive carbon black, and a wide carbon fiber bundle as essential components (see, for example, PTL 1). This molding material, which provides a molded article having excellent appearance, however has a strong odor due to the use of a highly volatile styrene monomer, leading to a problem about working environment in the molding work.

Films used in production or packaging of a molding material are required to be easy to peel since the films have to be removed from the material before molding. In a material poor in the film peeling ability, a significant amount of burr is generated in molding due to insufficient thickening of the material. Such a material has poor moldability and requires a certain time for work before molding. If the molding material after peeling the film also has poor tackiness, such a material not only requires a time in work before molding but also the poor tackiness is a factor for changing the carbon fiber content in the molding material. Thus, there has been a need for a material excellent in handleability, such as film peeling ability and tackiness.

CITATION LIST

Patent Literature

PTL 1: JP-A-2009-13306

SUMMARY OF INVENTION

Technical Problem

The problem that the invention is to solve is to provide a fiber-reinforced molding material that is excellent in working environment in molding work, handleability, including film peeling ability and tackiness, and moldability of the molding material, and that can provide a molded article excellent in appearance and various physical properties, such as bending strength, and to provide a molded article thereof.

Solution to Problem

The present inventors have found that a fiber-reinforced molding material containing a specific vinyl ester, an unsaturated monomer having a flash point of 100° C. or higher, a polymerization initiator, and carbon fibers having a fiber length of 2.5 to 50 mm as essential components is excellent in handleability and moldability and can provide a molded article excellent in appearance and various physical properties, such as bending strength, completing the present invention.

Specifically, the present invention relates to a fiber-reinforced molding material including as essential materials: a vinyl ester (A) that is a reaction product of an epoxy resin (a1) having an epoxy equivalent in the range of 180 to 500 and (meth)acrylic acid (a2); an unsaturated monomer (B) having a flash point of 100° C. or higher; a polyisocyanate (C); a polymerization initiator (D); and carbon fibers (E) having a fiber length of 2.5 to 50 mm, in which the mass ratio z((A)/(B)) of the vinyl ester (A) to the unsaturated monomer (B) is in the range of 40/60 to 85/15, and the molar ratio (NCO/OH) of isocyanate groups (NCO) in the polyisocyanate (C) to hydroxy groups (OH) in the vinyl ester (A) is in the range of 0.25 to 0.85, and relates to a molded article produced using the fiber-reinforced molding material.

Advantageous Effects of Invention

A molded article obtained from the fiber-reinforced molding material of the present invention is excellent in appearance, bending strength, bending elastic modulus, and the like, and thus can be suitably used in housings and the like of automobile members, railroad vehicle members, aerospace plane members, vessel members, household appliance members, sports members, light vehicle members, civil engineering and construction members, OA equipment, and the like.

DESCRIPTION OF EMBODIMENTS

The fiber-reinforced molding material of the present invention is a fiber-reinforced molding material including as essential materials: a vinyl ester (A) that is a reaction product of an epoxy resin (a1) having an epoxy equivalent in the range of 180 to 500 and (meth)acrylic acid (a2); an unsaturated monomer (B) having a flash point of 100° C. or higher; a polyisocyanate (C); a polymerization initiator (D); and carbon fibers (E) having a fiber length of 2.5 to 50 mm, in which the molar ratio (COOH/EP) of epoxy groups (EP) in the epoxy resin (a1) to carboxy groups (COOH) in the (meth)acrylic acid (a2) is in the range of 0.6 to 1.1, the mass ratio ((A)/(B)) of the vinyl ester (A) to the unsaturated monomer (B) is in the range of 40/60 to 85/15, and the molar ratio (NCO/OH) of isocyanate groups (NCO) in the polyisocyanate (C) to hydroxy groups (OH) in the vinyl ester (A) is in the range of 0.25 to 0.85.

In the present invention, "(meth)acrylic acid" refers to one or both of acrylic acid and methacrylic acid.

The vinyl ester (A) can be obtained by reacting an epoxy resin (a1) having an epoxy equivalent in the range of 180 to 500 with (meth)acrylic acid (a2). The vinyl ester (A) contains molecular chains each having two or more hydroxy groups. Accordingly, the reaction is preferably performed at a molar ratio (COOH/EP) in the range of 0.6 to 1.1 since the fiber-reinforced molding material of the present invention obtained through a reaction with an aromatic isocyanate is excellent in the balance between handleability in molding, such as film peeling ability and tackiness, and flowability. From the same viewpoint, the epoxy equivalent of the epoxy resin (a1) is more preferably in the range of 200 to 400.

Examples of the epoxy resins (a1) include bisphenol-type epoxy resins, such as bisphenol A-type epoxy resins, bisphenol F-type epoxy resins, bisphenol fluorene-type epoxy resins, and biscresol fluorene-type epoxy resins; novolac-type epoxy resins, such as phenol novolac-type epoxy resins and cresol novolac-type epoxy resins; phenol glycidyl ethers, such as oxzodoridon-modified epoxy resins and brominated epoxy resins of such resins; polyhydric alcohol glycidyl ethers, such as dipropylene glycol diglycidyl ether, trimethylolpropane triglycidyl ether, a bisphenol A alkylene oxide adduct diglycidyl ether, and hydrogenated bisphenol A diglycidyl ether; alicyclic epoxy resins, such as 3,4-epoxy-6-methylcyclohexylmethyl-3,4-epoxy-6-methylcyclohexane carboxylate and 1-epoxyethyl-3,4-epoxycyclohexane; glycidyl esters, such as phthalic acid diglycidyl ester, tetrahydrophthalic acid diglycidyl ester, diglycidyl-p-oxybenzoic acid, and dimer acid glycidyl ester; glycidyl amines, such as tetraglycidyldiaminodiphenylmethane, tetraglycidyl-m-xylylenediamine, triglycidyl-p-aminophenol, and N,N-diglycidylaniline; heterocyclic epoxy resins, such as 1,3-diglycidyl-5,5-dimethylhydantoin and triglycidyl isocyanurate. Among them, bifunctional aromatic epoxy resins are preferred because of the excellent molded article strength and handleability of the molding material, and the excellent flowability in molding of the molding material, and bisphenol A-type epoxy resins and bisphenol F-type epoxy resins are more preferred. The epoxy resins may be used alone or in combination of two or more thereof. The epoxy equivalent of the epoxy resin (a1) in the case of combined use of two or more epoxy resins is the average of epoxy equivalents of all the epoxy resins.

The epoxy resin (a1) can be further polymerized by a dibasic acid, such as bisphenol A, before use for adjusting an epoxy equivalent.

The aforementioned reaction of the epoxy resin and (meth)acrylic acid is preferably performed at 60 to 140° C. using an esterification catalyst. A polymerization inhibitor or the like can also be used.

It is important that the unsaturated monomer (B) has a flash point of 100° C. or higher. This contributes to suppression of odor in molding work, leading to superior working environment. Furthermore, owing to the high boiling point of the unsaturated monomer, the molding material is excellent in moldability in high temperature molding, and high-temperature and short-time molding can be achieved, leading to improved productivity.

The flash point in the present invention is a flash point measured by the Cleveland Open Cup Method defined in JIS K 2265-4:2007.

Examples of the unsaturated monomers (B) include monofunctional (meth)acrylate compounds, such as benzyl (meth)acrylate, phenoxyethyl (meth)acrylate, phenoxypolyethylene glycol (meth)acrylates, polyethylene glycol (meth)acrylate alkyl ethers, polypropylene glycol (meth)acrylate alkyl ethers, 2-ethylhexyl methacrylate, isodecyl (meth)acrylate, lauryl (meth)acrylate, isotridecyl (meth)acrylate, n-stearyl (meth)acrylate, tetrahydrofurfuryl methacrylate, isobornyl (meth)acrylate, dicyclopentenyloxyethyl (meth)acrylate, and dicyclopentanyl methacrylate; di(meth)acrylate compounds, such as ethylene glycol di(meth)acrylate, propylene glycol di(meth)acrylate, 1,4-butanediol di(meth)acrylate, 1,3-butanediol di(meth)acrylate, neopentylglycol di(meth)acrylate, 1,6-hexanediol di(meth)acrylate, bisphenol di(meth)acrylate, and 1,4-cyclohexane dimethanol di(meth)acrylate; and diallyl phthalate and divinylbenzene. Among them, unsaturated monomers having an aromatic group are preferred since molding materials having higher strength can be obtained, and benzyl methacrylate and phenoxyethyl methacrylate are more preferred. The unsaturated monomers may be used alone or in combination of two or more thereof.

The mass ratio ((A)/(B)) of the vinyl ester (A) to the unsaturated monomer (B) is in the range of 40/60 to 85/15. The mass ratio is preferably in the range of 50/50 to 70/30 for more improved balance between impregnation of resin with the carbon fibers, handleability (tackiness), and curability.

The viscosity of a mixture of the vinyl ester (A) and the unsaturated monomer (B) is preferably in the range of 200 to 8000 mPa·s (25° C.) for further improvement in impregnation of the carbon fibers with the resin.

Examples of the polyisocyanates (C) include aromatic polyisocyanates, such as diphenylmethane diisocyanate (4,4'-form, 2,4'-form, or 2,2'-form, or mixtures thereof), modified diphenylmethane diisocyanates, for example, a carbodiimide-modified, nurate-modified, biuret-modified, and urethanimine-modified diphenylmethane diisocyanate, and a polyol-modified diphenylmethane diisocyanate which is modified with a polyol having a number average molecular weight of 1,000 or less, such as diethylene glycol or dipropylene glycol, tolylene diisocyanate, tolidine diisocyanate, polymethylene polyphenyl polyisocyanates, xylylene diisocyanate, 1,5-naphthalene diisocyanate, and tetramethylxylylene diisocyanate; alicyclic polyisocyanates, such as isophorone diisocyanate, hydrogenated diphenylmethane diisocyanate, hydrogenated xylylene diisocyanate, and norbornene diisocyanate; and aliphatic polyisocyanates, such as hexamethylene diisocyanate, a nurate-modified form, a biuret-modified form, and an adduct form of hexamethylene diisocyanate, and dimer acid diisocyanate. Among them, since molding materials excellent in handleability (film peeling ability and tackiness) can be obtained, aromatic polyisocyanates are preferred, and a carbodiimide-modified diphenylmethane diisocyanate is more preferred. Examples of carbodiimide-modified diphenylmethane diisocyanates include those having a carbodiimide group, as well as those having a urethaneimine structure obtained by further addition of an isocyanate group to the carbodiimide group. The polyisocyanates (C) may be used alone or in combination of two or more thereof.

The molar ratio (NCO/OH) of isocyanate groups (NCO) in the polyisocyanate (C) to hydroxy groups (OH) in the vinyl ester (A) is 0.25 to 0.85, and since the balance between handleability (film peeling ability and tackiness) due to the higher molecular weight and resin flowability in molding is further superior, the molar ratio is preferably 0.5 to 0.8.

The polymerization initiator (D) is not limited but preferably an organic peroxide. Examples include diacyl peroxide compounds, peroxyester compounds, hydroperoxide compounds, ketone peroxide compounds, alkyl perester compounds, percarbonate compounds, and peroxy ketals, and can be appropriately selected depending on the molding conditions. The polymerization initiators D) may be used alone or in combination of two or more thereof.

Among them, a polymerization initiator that provides a 10-hour half-life temperature of 70° C. or higher and 110° C. or lower is preferably used for the purpose of reducing the molding time. A 10-hour half-life temperature of 70° C. or higher and 110° C. or lower is preferred since the fiber-reinforced molding material has a long lifetime at normal temperature, and can be cured in a short time with heat, and then the balance between curability and moldability is further superior. Example of such polymerization initiators include 1,6-bis(t-butylperoxycarbonyloxy)hexane, 1,1-bis(t-butylperoxy)cyclohexane, 1,1-bis(t-amylperoxy)cyclohexane, 1,1-bis(t-hexylperoxy)cyclohexane, t-butylperoxydiethyl acetate, t-butyl peroxyisopropyl carbonate, t-amyl peroxyisopropyl carbonate, t-hexyl peroxyisopropyl carbonate, ditert-butyl peroxyhexahydroterephthalate, and t-amyl peroxytrimethyl hexanoate.

The content of the polymerization initiator (D) is preferably in the range of 0.3 to 3% by mass relative to the total amount of the vinyl ester (A) and the unsaturated monomer (B) since curing characteristics and storage stability are both excellent.

As the carbon fibers (E), carbon fibers cut into a length of 2.5 to 50 mm may be used, and since in-mold flowability in molding, appearance and mechanical physical properties of molded articles are further enhanced, carbon fibers cut into a length of 5 to 40 mm are more preferred.

As the carbon fibers (E), various types, such as a polyacrylonitrile type, a pitch type, and a rayon type may be used. Among them, a polyacrylonitrile type is preferred since carbon fibers having high strength can be easily obtained.

The number of filaments in a bundle of fibers used as the carbon fiber (E) is preferably 1000 to 60000 since resin impregnation and mechanical physical properties of molded articles are further enhanced.

The content of the carbon fibers (E) in the fiber-reinforced molding material of the present invention is preferably in the range of 25 to 80% by mass and more preferably in the range of 40 to 70% by mass since mechanical physical properties of the obtained molded article are further enhanced. With a lower content of the carbon fibers, a molded article having high strength may not be obtained, whereas a higher content of the carbon fibers leads to insufficient resin impregnation into fibers, causing blisters in molded articles, and a molded article having high strength may also not be obtained.

In the fiber-reinforced molding material of the present invention, the carbon fibers (E) may be impregnated in a random fiber direction with the resin.

As components of the fiber-reinforced molding material of the present invention, other materials than the vinyl ester (A), the unsaturated monomer (B), the polyisocyanate (C), the polymerization initiator (D), and the carbon fiber bundle (E) may be used. The fiber-reinforced molding material may contain, for example, any other thermosetting resin than the vinyl ester (A), a thermoplastic resin, a polymerization inhibitor, a curing accelerator, a filler, a low profile agent, a mold release agent, a thickening agent, a viscosity reducer, a pigment, an antioxidant, a plasticizer, a flame retardant, an antimicrobial agent, a UV stabilizer, a reinforcing agent, and a photocuring agent.

Examples of the thermosetting resin include vinylurethane resins, unsaturated polyester resins, acrylic resins, epoxy resins, phenol resins, melamine resins, and furan resins. The thermosetting resins may be used alone or in combination of two or more thereof.

Examples of the thermoplastic resin include polyamide resins, polyethylene terephthalate resins, polybutylene terephthalate resins, polycarbonate resins, urethane resins, polypropylene resins, polyethylene resins, polystyrene resins, acrylic resins, polybutadiene resins, polyisoprene resins, and products of modification thereof by copolymerization and the like. The thermoplastic resins may be used alone or in combination of two or more thereof.

Example of the polymerization inhibitor include hydroquinone, trimethylhydroquinone, p-t-butylcatechol, t-butylhydroquinone, toluhydroquinone, p-benzoquinone, naphthoquinone, hydroquinone monomethyl ether, phenothiazine, copper naphthenate, and copper chloride. The polymerization inhibitors may be used alone or in combination of two or more thereof.

Examples of the curing accelerator include metal soaps, such as cobalt naphthenate, cobalt octenoate, vanadyl octenoate, copper naphthenate, and barium naphthenate; d metal chelate compounds, such as vanadyl acetylacetate, cobalt acetylacetate, and iron acetylacetonate. Examples of amines include N,N-dimethylamino-p-benzaldehyde, N,N-dimethylaniline, N,N-diethylaniline, N,N-dimethyl-p-toluidine, N-ethyl-m-toluidine, triethanol amine, m-toluidine, diethylene triamine, pyridine, phenylmorpholine, piperidine, and diethanolaniline. The curing accelerators may be used lone or in combination of two or more thereof.

As the filler, an inorganic or organic compound may be used for adjusting physical properties, such as strength, elastic modulus, impact strength, and fatigue durability, of molded articles.

Examples of the inorganic compound include calcium carbonate, magnesium carbonate, barium sulfate, mica, talc, kaolin, clay, celite, asbestos, perlite, baryta, silica, silica sand, dolomitic limestone, gypsum, aluminum fine powder, hollow balloon, alumina, glass powder, aluminum hydroxide, white limestone, zirconium oxide, antimony trioxide, titanium oxide, molybdenum dioxide, and iron powder.

Examples of the organic compound include natural saccharide powders, such as cellulose and chitin, and synthetic resin powders. As the synthetic resin powder, organic powders formed of hard resins, soft rubbers, elastomers, polymers (copolymers), or the like and particles having a multilayer structure, such as a core-shell-type structure, can be used. Specific examples include particles formed of butadiene rubbers and/or acrylic rubbers, urethane rubbers, silicon rubbers, and the like, polyimide resin powders, fluoride resin powders, and phenol resin powders. The fillers may be used alone or in combination of two or more thereof.

Examples of the mold release agent include zinc stearate, calcium stearate, paraffin wax, polyethylene wax, and carnauba wax. Preferred examples include paraffin wax, polyethylene wax, and carnauba wax. The mold release agents may be used alone or in combination of two or more thereof.

Examples of the thickening agent include metal oxides and metal hydroxides, such as magnesium oxide, magnesium hydroxide, calcium oxide, and calcium hydroxide, and acrylic resin fine particles, and can be appropriately selected depending on the handleability of the fiber-reinforced molding material of the present invention. The thickening agents may be used alone or in combination of two or more thereof.

The fiber-reinforced molding material of the present invention is preferably a sheet molding compound (hereinafter abbreviated as "SMC") or a bulk molding compound (hereinafter abbreviated as "BMC") from the viewpoints of excellent productivity and moldability for design diversity.

A method for producing the SMC may include mixing and dispersing the vinyl ester (A), the unsaturated monomer (B), the polyisocyanate (C), the polymerization initiator (D), and other components using a mixer, such as an ordinary mixer, an inter-mixer, a planetary mixer, a roll, a kneader, or an extruder; applying the obtained resin composition with a uniform thickness onto carrier films which are vertically placed; sandwiching the carbon fibers (E) with the resin composition on the vertically placed carrier films; then allowing the entire assembly to pass through an impregnation roll to impregnate the carbon fibers (E) with the resin composition under an applied pressure; and winding or folding the assembly into a roll or a zigzag form. After that, aging at a temperature of 25 to 60° C. is preferably further performed. As the carrier film, a polyethylene film, a polypropylene film, a laminate film of polyethylene and polypropylene, a polyethylene terephthalate, a nylon, and the like may be used.

A method for producing the BMC may include, as in the method for producing the SMC, mixing and dispersing the vinyl ester (A), the unsaturated monomer (B), the polyisocyanate (C), the polymerization initiator (D), and other components using a mixer, such as an ordinary mixer, an inter-mixer, a planetary mixer, a roll, a kneader, or an extruder; and mixing and dispersing the carbon fibers (E) into the obtained resin composition. As in the case of SMC, aging at a temperature of 25 to 60° C. is preferably performed.

The molded article of the present invention is obtained from the fiber-reinforced molding material. The method for molding the material is preferably thermocompression molding of SMC or BMC from the viewpoint of excellent productivity and design diversity.

As the thermocompression molding, for example, a production method is used in which a prescribed amount of a molding material, such as SMC or BMC, was measured and put into a mold that is previously heated to 110 to 180° C., and mold clamping is performed with a compression molding machine to shape the molding material, the molding pressure is kept at 0.1 to 30 MPa to cure the molding material, and then the molded article is taken out to obtain a molded article. As a specific molding condition, preferred is a molding condition where a molding pressure of 1 to 10 MPa is kept in a mold at a mold temperature of 120 to 160° C. for 1 to 2 minutes per millimeter molded article thickness. A molding condition where a molding pressure of 1 to 10 MPa is kept at a mold temperature of 140 to 160° C. for 30 to 90 seconds per millimeter molded article thickness is more preferred since productivity is further enhanced.

Molding articles obtained from the fiber-reinforced molding material of the present invention are excellent in appearance, bending strength, bending elastic modulus, and the like, and thus can be suitably used in housings and the like of automobile members, railroad vehicles members, aerospace plane members, vessel members, household appliance members, sports members, light vehicle members, civil engineering and construction members, OA equipment, and the like.

EXAMPLES

The present invention will be described in more detail below with reference to specific examples. The hydroxy group values are determined by measuring an amount in milligram of potassium hydroxide (mgKOH/g) needed to neutralize acetic acid generated in a reaction of 1 g of a resin sample with an acetylation agent at a specified temperature for a specified time according to a method defined in JIS K-0070.

Synthetic Example 1

Synthesis of Vinyl Ester (A-1)

In a 2-L flask equipped with a thermometer, a nitrogen introduction tube, and a stirrer were put 661 parts by mass of an epoxy resin ("EPICLON 850" manufactured by DIC Corporation, bisphenol A-type epoxy resin, epoxy equivalent 188), 58.8 parts by mass of bisphenol A, and 0.36 parts by mass of 2-methylimidazole, and the mixture was heated to 120° C. and was reacted for 3 hours, and the epoxy equivalent was measured. After it was confirmed that the epoxy equivalent reached the set value 240, the mixture was cooled to around 60° C. Then, 253 parts by mass of methacrylic acid and 0.28 parts by mass of t-butylhydroquinone were added, and the mixture was heated to 90° C. under a stream of a 1:1 mixed gas of nitrogen and air. 0.25 parts by mass of 2-methylimidazole was added thereto and the mixture was heated to 110° C. and was reacted for 10 hours. The acid value then became 6 or less and the reaction was stopped. The resultant was cooled to around 60° C. and was taken out of the reaction vessel to thereby obtain a vinyl ester (A-1) having a hydroxy group value of 206 mg/KOH.

Synthetic Example 2

Synthesis of Vinyl Ester (A-2)

In a flask similar to that of Synthetic Example 1 were put 667 parts by mass of the epoxy resin ("EPICLON 850" manufactured by DIC Corporation, bisphenol A-type epoxy resin, epoxy equivalent 188), 96.9 parts by mass of bisphenol A, and 0.38 parts by mass of 2-methylimidazole, the mixture was heated to 120° C. and was reacted for 3 hours, and the epoxy equivalent was measured. After it was confirmed that the epoxy equivalent reached the set value 283, the mixture was cooled to around 60° C. Then, 228 parts by mass of methacrylic acid and 0.29 parts by mass of t-butylhydroquinone were added and the mixture was heated to 90° C. under a stream of a 1:1 mixed gas of nitrogen and air. 0.23 parts by mass of 2-methylimidazole was added thereto, and the mixture was heated to 110° C. and was reacted for 10 hours. The acid value then became 6 or less and the reaction was stopped. The resultant was cooled to around 60° C. and was taken out of the reaction vessel to thereby obtain a vinyl ester (A-2) having a hydroxy group value of 204 mgKOH/g.

Synthetic Example 3

Synthesis of Vinyl Ester (A-3)

In a flask similar to that of Synthetic Example 1 were put 656 parts by mass of the epoxy resin ("EPICLON 850"

manufactured by DIC Corporation, bisphenol A-type epoxy resin, epoxy equivalent 188), 147 parts by mass of bisphenol A, and 0.4 parts by mass of 2-methylimidazole, the mixture was heated to 120° C. and reacted for 3 hours and the epoxy equivalent was measured. After it was confirmed that the epoxy equivalent reached the set value 365, the mixture was cooled to around 60° C., 185 parts by mass of methacrylic acid and 0.29 parts by mass of t-butylhydroquinone were added, and the mixture was heated to 90° C. under a stream of a 1:1 mixed gas of nitrogen and air. 0.18 parts by mass of 2-methylimidazole was added thereto and the mixture was heated to 110° C. and was reacted for 10 hours. The acid value then became 6 or less and the reaction was stopped. The resultant was cooled to around 60° C. and was taken out of the reaction vessel to thereby obtain a vinyl ester (A-3) having a hydroxy group value of 202 mgKOH/g.

Synthetic Example 4

Synthesis of Vinyl Ester (A-4)

In a flask similar to that of Synthetic Example 1 were put 677 parts by mass of the epoxy resin ("EPICLON 850" manufactured by DIC Corporation, bisphenol A-type epoxy resin, epoxy equivalent 188), 310 parts by mass of methacrylic acid, and 0.29 parts by mass of t-butylhydroquinone, and the mixture was heated to 90° C. under a stream of a 1:1 mixed gas of nitrogen and air. 0.60 parts by mass of 2-methylimidazole was added thereto, and the mixture was heated to 110° C. and was reacted for 10 hours. The acid value then became 6 or less and the reaction was stopped. The resultant was cooled to around 60° C. and was taken out of the reaction vessel to thereby obtain a vinyl ester (A-4) having a hydroxy group value of 213 mgKOH/g.

Synthetic Example 5

Synthesis of Vinyl Ester (RA-1)

In a flask similar to that of Synthetic Example 1 were put 680 parts by mass of an epoxy resin ("EPICLON 850-CRP" manufactured by DIC Corporation, bisphenol A-type epoxy resin, epoxy equivalent 170), 337 parts by a mass of methacrylic acid, and 0.29 parts by mass of t-butylhydroquinone, and the mixture was heated to 90° C. under a stream of a 1:1 mixed gas of nitrogen and air. 0.67 parts by mass of 2-methylimidazole was added thereto and the mixture was heated to 110° C. and was reacted for 10 hours. The acid value then became 6 or less and the reaction was stopped. The resultant was cooled to around 60° C. and was taken out of the reaction vessel to thereby obtain a vinyl ester (RA-1) having a hydroxy group value of 210 mgKOH/g.

Example 1

Production and Evaluation of Fiber-Reinforced Molding Material (1)

Into 100 parts by mass of a resin solution in which 60 parts by mass of the vinyl ester (A-1) obtained in Synthetic Example 1 was dissolved in 40 parts by mass of phenoxyethyl methacrylate, 23.3 parts by mass of a polyisocyanate ("Cosmonate LL" manufactured by Mitsui Chemicals Inc., hereinafter abbreviated as "polyisocyanate (C-1)") and 1 part of polymerization initiator ("Kayacarbon AIC-75" manufactured by Kayaku Akzo Corporation, organic peroxide, hereinafter abbreviated as "polymerization initiator (D-1)") were mixed to thereby obtain a resin composition (X-1). The molar ratio (NCO/OH) in the resin composition (X-1) was 0.71.

The resin composition (X-1) obtained above was applied on a laminate film of a polyethylene and a polypropylene in an average application amount of 1 kg/m$^2$, and carbon fibers obtained by cutting a carbon fiber roving ("T700SC-12000-50C" manufactured by TORAY INDUSTRIES INC.) into 25 mm pieces (hereinafter abbreviated as carbon fibers (E-1)) were allowed to fall down thereon from air into a uniform thickness without any fiber orientation so as to give a carbon fiber content of 50% by mass, and the carbon fibers were sandwiched with a film also having the resin composition (X-1) applied thereon to impregnate the carbon fibers with the resin, and then the assembly (the sandwich composite) was allowed to stand in a 45° C. thermostat for 24 hours, thereby obtaining a sheet-shaped fiber-reinforced molding material (1). The basis weight of the sheet-shaped fiber-reinforced molding material (1) was 2 kg/m.

[Evaluation of Handleability (Film Release Property)]

The handleability when the film was stripped off the fiber-reinforced molding material (1) obtained above at a room temperature was evaluated according to the following criteria.

○: no resin deposited on film
Δ: a little resin deposited on film
x: some resin deposited on film

[Evaluation of Handleability (Tackiness)]

The tackiness after the film was stripped off the fiber-reinforced molding material (1) obtained above at a room temperature was evaluated according to the following criteria.

○: no molding material deposited on finger
Δ: a little molding material deposited on finger
x: some molding material deposited on finger

[Production of Molded Article]

The sheet-shaped fiber-reinforced molding material (1) obtained above was cut into 30 cm×15 cm to form a sheet, and the carrier film was stripped off the sheet-shaped fiber-reinforced molding material (1). Three, thus-obtained sheets were stacked and the stack was set on a left half of a plate mold of 30×30 cm$^2$, and was molded at a pressing mold temperature of 150° C. for a pressing time of 2 minutes and at a pressing pressure of 8 MPa, thereby obtaining a plate-like molded article (1) having a thickness of 2 mm.

[Evaluation of Moldability (Flowability)]

The moldability in production of the molded article (1) was evaluated according to the following criteria.

○: molding material flowable and no damage in molded article
x: molding material insufficiently flowable and some damage in molded article

[Evaluation of Moldability (Appearance)]

In the molded article (1) obtained above, the appearance of the right half obtained by flow of the fiber-reinforced molding material (1) in the mold was visually evaluated according to the following criteria.

○: no blister
x: some blisters

[Evaluation of Bending Strength and Bending Elastic Modulus]

In the molded article (1) obtained above, the right half obtained by flow of the fiber-reinforced molding material (1) was subjected to a 3-point bending test according to JIS K7074 to measure the bending strength and the bending elastic modulus.

Example 2

Production and Evaluation of Fiber-Reinforced Molding Material (2)

Into 100 parts by mass of a resin solution in which 55 parts by mass of the vinyl ester (A-2) obtained in Synthetic Example 2 was dissolved in 45 parts by mass of phenoxyethyl methacrylate, 21.9 parts by mass of the polyisocyanate (C-1) and 1 part of the polymerization initiator (D-1) were mixed to obtain a resin composition (X-2). The molar ratio (NCO/OH) in the resin composition (X-2) was 0.74.

A fiber-reinforced molding material (2) was produced in the same operation as in Example 1 except that the resin composition (X-1) used in Example 1 was changed to the resin composition (X-2), and was subjected to the evaluations.

Example 3

Production and Evaluation of Fiber-Reinforced Molding Material (3)

Into 100 parts by mass of a resin solution in which 55 parts by mass of the vinyl ester (A-2) obtained in Synthetic Example 2 was dissolved in 45 parts by mass of benzyl methacrylate, 21.9 parts by mass of the polyisocyanate (C-1) and 1 part of the polymerization initiator (D-1) were mixed to obtain a resin composition (X-3). The molar ratio (NCO/OH) in the resin composition (X-3) was 0.74.

A fiber-reinforced molding material (3) was produced in the same operation as in Example 1 except that the resin composition (X-1) used in Example 1 was changed to the resin composition (X-3), and was subjected to the evaluations.

Example 4

Production and Evaluation of Fiber-Reinforced Molding Material (4)

Into 100 parts by mass of a resin solution in which 50 parts by mass of the vinyl ester (A-3) obtained in Synthetic Example 3 was dissolved in 50 parts by mass of phenoxyethyl methacrylate, 14.6 parts by mass of the polyisocyanate (C-1) and 1 part of the polymerization initiator (D-1) were mixed to obtain a resin composition (X-4). The molar ratio (NCO/OH) in the resin composition (X-4) was 0.55.

A fiber-reinforced molding material (4) was produced in the same operation as in Example 1 except that the resin composition (X-1) used in Example 1 was changed to the resin composition (X-4), and was subjected to the evaluations.

Example 5

Production and Evaluation of Fiber-Reinforced Molding Material (5)

Into 100 parts by mass of a resin solution in which 60 parts by mass of the vinyl ester (A-4) obtained in Synthetic Example 4 was dissolved in 40 parts by mass of phenoxyethyl methacrylate, 24.9 parts by mass of the polyisocyanate (C-1) and 1 part of the polymerization initiator (D-1) were mixed to obtain a resin composition (X-5). The molar ratio (NCO/OH) in the resin composition (X-5) was 0.74.

A fiber-reinforced molding material (5) was produced in the same operation as in Example 1 except that the resin composition (X-1) used in Example 1 was changed to the resin composition (X-5), and was subjected to the evaluations.

Comparative Example 1

Production and Evaluation of Fiber-Reinforced Molding Material (R1)

Into 100 parts by mass of a resin solution in which 55 parts by mass of the vinyl ester (A-3) obtained in Synthetic Example 3 was dissolved in 45 parts by mass of styrene, 10.7 parts by mass of the polyisocyanate (C-1) and 1 part of the polymerization initiator (D-1) were mixed to obtain a resin composition (RX-1). The molar ratio (NCO/OH) in the resin composition (RX-1) was 0.37.

A fiber-reinforced molding material (R1) was produced in the same operation as in Example 1 except that the resin composition (X-1) used in Example 1 was changed to the resin composition (RX-1), and was subjected to the evaluations.

Comparative Example 2

Production and Evaluation of Fiber-Reinforced Molding Material (R2)

Into 100 parts by mass of a resin solution in which 70 parts by mass of the vinyl ester (A-3) obtained in Synthetic Example 3 was dissolved in 30 parts by mass of methyl methacrylate, 10.7 parts by mass of the polyisocyanate (C-1) and 1 part of the polymerization initiator (D-1) were mixed to obtain a resin composition (RX-2). The molar ratio (NCO/OH) in the resin composition (RX-2) was 0.29.

A fiber-reinforced molding material (R2) was produced in the same operation as in Example 1 except that the resin composition (X-1) used in Example 1 was changed to the resin composition (RX-2), and was subjected to the evaluations of handleability and moldability.

Comparative Example 3

Production and Evaluation of Fiber-Reinforced Molding Material (R3)

Into 100 parts by mass of a resin solution in which 60 parts by mass of the vinyl ester (RA-1) obtained in Synthetic Example 5 was dissolved in 40 parts by mass of phenoxyethyl methacrylate, 24.2 parts by mass of the polyisocyanate (C-1) and 1 part of the polymerization initiator (D-1) were mixed to obtain a resin composition (RX-3). The molar ratio (NCO/OH) in the resin composition (RX-3) was 0.74.

A fiber-reinforced molding material (R3) was produced in the same operation as in Example 1 except that the resin composition (X-1) used in Example 1 was changed to the resin composition (RX-3), and was subjected to the evaluation of handleability.

Comparative Example 4

Production and Evaluation of Fiber-Reinforced Molding Material (R4)

Into 100 parts by mass of a resin solution in which 35 parts by mass of the vinyl ester (A-1) obtained in Synthetic Example 1 was dissolved in 65 parts by mass of phenoxyethyl methacrylate, 15.4 parts by mass of the polyisocyanate (C-1) and 1 part of the polymerization initiator (D-1) were mixed to obtain the resin composition (RX-4). The molar ratio (NCO/OH) in the resin composition (RX-4) was 0.80.

A fiber-reinforced molding material (R4) was produced in the same operation as in Example 1 except that the resin composition (X-1) used in Example 1 was changed to the resin composition (RX-4), and was subjected to the evaluation of handleability.

Comparative Example 5

Production and Evaluation of Fiber-Reinforced Molding Material (R5)

Into 100 parts by mass of a resin solution in which 55 parts by mass of the vinyl ester (A-2) obtained in Synthetic Example 2 was dissolved in 45 parts by mass of phenoxyethyl methacrylate, 28.1 parts by mass of the polyisocyanate (C-1) and 1 part of the polymerization initiator (D-1) were mixed to obtain a resin composition (RX-5). The molar ratio (NCO/OH) in the resin composition (RX-5) was 0.95.

A fiber-reinforced molding material (R5) was produced in the same operation as in Example 1 except that the resin composition (X-1) used in Example 1 was changed to the resin composition (RX-5), and was subjected to the evaluations of handleability and moldability.

Table 1 shows the evaluation results of the fiber-reinforced molding materials (1) to (5) obtained above.

TABLE 1

|  |  | Example 1 | Example 2 | Example 3 | Example 4 | Example 5 |
|---|---|---|---|---|---|---|
| Fiber-reinforced molding material |  | (1) | (2) | (3) | (4) | (8) |
| Vinyl ester (A) |  | (A-1) | (A-2) | (A-2) | (A-3) | (A-4) |
| Epoxy equivalent of epoxy resin |  | 240 | 283 | 283 | 365 | 188 |
| Unsaturated monomer (B) |  | Phenoxyethyl methacrylate | Phenoxyethyl methacrylate | Benzyl methacrylate | Phenoxyethyl methacrylate | Phenoxyethyl methacrylate |
| Flash point (° C.) |  | 120 | 120 | 115 | 120 | 120 |
| Polyisocyanate (C) |  | (C-1) | (C-1) | (C-1) | (C-1) | (C-1) |
| Mass ratio ((A)/(B)) |  | 60/40 | 55/45 | 55/45 | 50/50 | 60/40 |
| Molar ratio (NCO/OH) |  | 0.71 | 0.74 | 0.74 | 0.55 | 0.74 |
| Handleability | Film peeling ability | ○ | ○ | ○ | ○ | Δ |
|  | Tackiness | ○ | ○ | ○ | ○ | Δ |
| Moldability (150° C.) | Flowability | ○ | ○ | ○ | ○ | ○ |
|  | Appearance | ○ | ○ | ○ | ○ | ○ |
| In-mold flowing portion bending strength (MPa) |  | 360 | 374 | 384 | 375 | 310 |
| In-mold flowing portion bending elastic modulus (GPa) |  | 18 | 19 | 21 | 19 | 17 |

Table 2 shows the results of evaluation of the fiber-reinforced molding materials (R1) to (R5) obtained above.

TABLE 2

|  |  | Comparative Example 1 | Comparative Example 2 | Comparative Example 3 | Comparative Example 4 | Comparative Example 5 |
|---|---|---|---|---|---|---|
| Fiber-reinforced molding material |  | (R1) | (R2) | (R3) | (R4) | (R5) |
| Vinyl ester (A) |  | (A-3) | (A-3) | (RA-1) | (A-1) | (A-2) |
| Epoxy equivalent of epoxy resin |  | 365 | 365 | 170 | 240 | 283 |
| Unsaturated monomer (B) |  | Styrene | Methyl methacrylate | Phenoxyethyl methacrylate | Phenoxyethyl methacrylate | Phenoxyethyl methacrylate |
| Flash point (° C.) |  | 31 | 10 | 120 | 120 | 120 |
| Polyisocyanate (C) |  | (C-1) | (C-1) | (C-1) | (C-1) | (C-1) |
| Mass ratio ((A)/(B)) |  | 55/45 | 70/30 | 60/40 | 35/65 | 55/45 |
| Molar ratio (NCO/OH) |  | 0.37 | 0.29 | 0.74 | 0.80 | 0.95 |
| Handleability | Film peeling ability | ○ | ○ | x | x | ○ |
|  | Tackiness | ○ | ○ | x | x | ○ |
| Moldability (150° C.) | Flowability | ○ | x | Not available | Not available | x |
|  | Appearance | x | x | Not available | Not available | ○ |
| In-mold flowing portion bending strength (MPa) |  | 264 | Not available | Not available | Not available | Not available |
| In-mold flowing portion bending elastic modulus (GPa) |  | 17 | Not available | Not available | Not available | Not available |

It was found that the fiber-reinforced molding materials of the present invention of Examples 1 to 5 were excellent in the handleability and moldability and provided molded articles excellent in the bending strength and bending elastic modulus.

On the other hand, Comparative Example 1, which was an example in which styrene having a flash point less than 100° C. was used as an unsaturated monomer, showed generation of a blister in a molded article. In addition, it was found that the molded article was inferior in the bending strength of a flowing portion in the mold.

It was found that Comparative Example 2, which was an example in which methyl methacrylate having a flash point less than 100° C. was used as an unsaturated monomer, showed inferior moldability. Thus, the evaluations of bending strength and bending elastic modulus could not be performed.

It was found that Comparative Example 3, which was an example in which the epoxy equivalent of the epoxy resin was less than 180 which is the lower limit, showed inferior handleability. Thus, the molding evaluation could not be performed.

It was found that Comparative Example 4, which was an example in which the mass ratio ((A)/(B)) was out of the range of 40/60 to 85/15, showed inferior handleability. Thus, the molding evaluation could not be performed.

It was found that Comparative Example 5, which was an example in which the molar ratio (NCO/OH) was more than 0.85 which is the upper limit, showed inferior moldability. Thus, the evaluations of bending strength and bending elastic modulus could not be performed.

The invention claimed is:

1. A fiber-reinforced molding material comprising as essential materials: a vinyl ester (A) that is a reaction product of an epoxy resin (a1) having an epoxy equivalent in the range of 180 to 500 and (meth)acrylic acid (a2); an unsaturated monomer (B) having a flash point of 100° C. or higher; a polyisocyanate (C); a polymerization initiator (D); and carbon fibers (E) having a fiber length of 2.5 to 50 mm, wherein the mass ratio ((A)/(B)) of the vinyl ester (A) to the unsaturated monomer (B) is in the range of 40/60 to 85/15, and the molar ratio (NCO/OH) of isocyanate groups (NCO) in the polyisocyanate (C) to hydroxy groups (OH) in the vinyl ester (A) is in the range of 0.25 to 0.85.

2. The fiber-reinforced molding material according to claim 1, wherein the molar ratio (COOH/EP) of epoxy groups (EP) in the epoxy resin (a1) to carboxy groups (COOH) in the (meth)acrylic acid (a2) is in the range of 0.6 to 1.1.

3. The fiber-reinforced molding material according to claim 2, wherein the polyisocyanate (C) is an aromatic polyisocyanate.

4. The fiber-reinforced molding material according to claim 1, wherein the unsaturated monomer (B) is phenoxyethyl methacrylate and/or benzyl methacrylate.

5. The fiber-reinforced molding material according to claim 4, wherein the molar ratio (COOH/EP) of epoxy groups (EP) in the epoxy resin (a1) to carboxy groups (COOH) in the (meth)acrylic acid (a2) is in the range of 0.6 to 1.1.

6. The fiber-reinforced molding material according to claim 4, wherein the polyisocyanate (C) is an aromatic polyisocyanate.

7. The fiber-reinforced molding material according to claim 1, wherein the polyisocyanate (C) is an aromatic polyisocyanate.

8. A molded article comprising a product produced using the fiber-reinforced molding material according to claim 1.

9. A molded article comprising a product produced using the fiber-reinforced molding material according to claim 4.

10. A molded article comprising a product produced using the fiber-reinforced molding material according to claim 2.

11. A molded article comprising a product produced using the fiber-reinforced molding material according to claim 7.

* * * * *